Jan. 31, 1961 P. D. BECKER 2,969,705
SELF-THREADING SHEET METAL NUT
Filed March 22, 1956
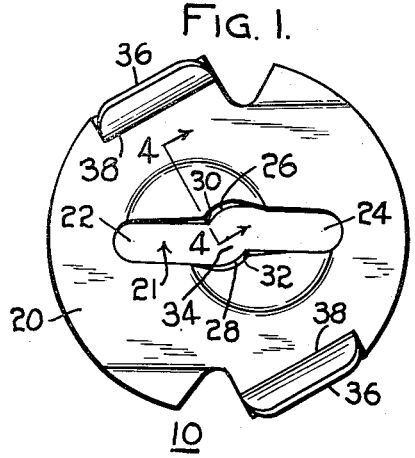
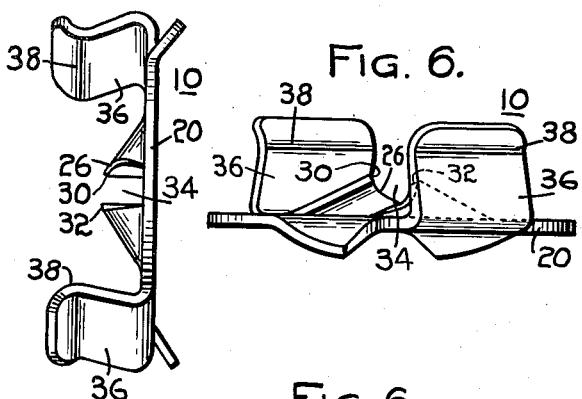
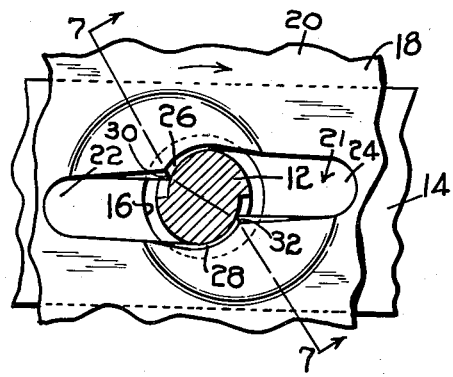
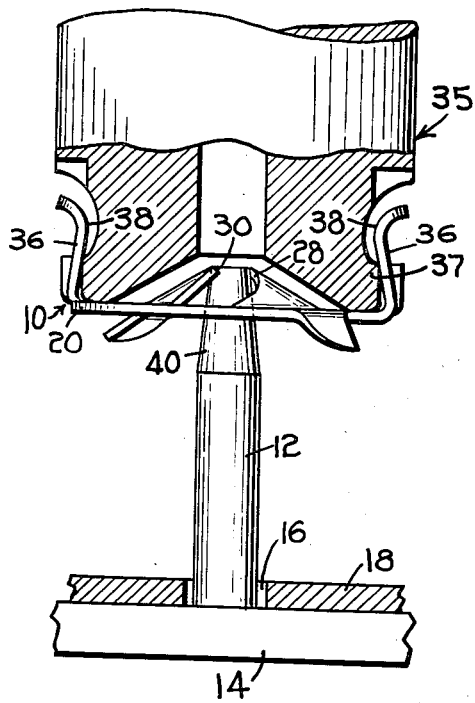
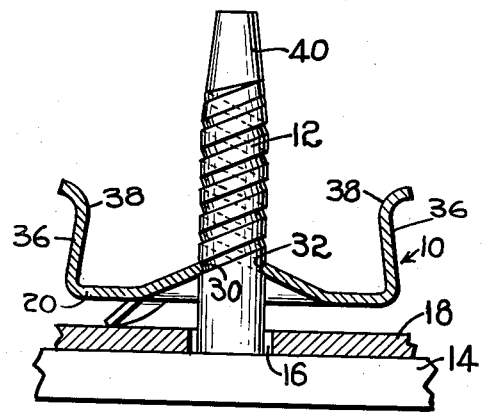
INVENTOR:
PHILIP D. BECKER,
BY Robert E Ross
ATTORNEY.

2,969,705
SELF-THREADING SHEET METAL NUT

Philip D. Becker, Hingham, Mass., assignor to United-Carr Fastener Corporation, Boston, Mass., a corporation of Delaware Filed Mar. 22, 1956, Ser. No. 573,156

4 Claims. (Cl. 85—36)

This invention relates generally to fastening devices and has particular reference to a sheet metal nut for assembly onto an unthreaded stud.

Many types of sheet metal fasteners are known which are designed for assembly onto smooth studs protruding from a device through a panel opening to retain the device on a panel. Such devices usually have a group of inclined tongues disposed about a stud-receiving opening for digging into engagement with the surface of the stud. Although fasteners of this type are satisfactory for some applications, they are not of themselves capable of drawing the stud through the panel opening to tighten the device against the panel, but instead the device must be forced tightly against the panel by other means when the fastener is assembled. This can be inconvenient when the front face of the panel is not readily accessible to a workman installing a fastener on the reverse side thereof.

Threaded fasteners are, of course, an obvious solution, however, it is inconvenient, expensive, or impossible to put threads on the stud, particularly when the article to be attached is formed of die cast metal. In the past it has been proposed to provide a nut which cuts its own threads on the stud, however, in many cases the article to be attached is chromium plated, which provides an extremely hard surface on the stud, and a nut capable of cutting threads on studs of this type has been found too expensive for most applications.

The object of this invention is to provide a nut which is capable of threading into tight engagement onto a smooth chromium-plated stud.

A further object of this invention is to provide a nut of the type described which is adapted for economical manufacture of sheet metal.

A further object of the invention is to provide a nut of the type described which is capable of being pushed onto a stud and then rotated to bite into the surface thereof to draw it tightly against the panel.

In the drawing:

Fig. 1 is a top plan view of a fastening device embodying the features of the invention;

Fig. 2 is a view of the fastener of Fig. 1 as seen from the right side;

Fig. 3 is a view of the fastener of Fig. 1 as seen from the lower side;

Fig. 4 is a view in section taken on line 4—4 of Fig. 1;

Fig. 5 is a view in elevation partly in section of the fastener held by a tool in position for assembly onto a stud;

Fig. 6 is a top plan view of the fastener assembled onto the stud; and

Fig. 7 is a view in section taken on line 7—7 of Fig. 6.

Referring to the drawing, there is illustrated a fastening device 10, which is adapted for assembly onto a smooth stud 12 protruding from an article 14 through an opening 16 in a panel 18 to retain the article in assembly on the panel.

The article 14 may be a nameplate, an ornament, or the like, formed of die cast metal which has been plated with chromium.

The fastening device 10 is formed of high carbon sheet steel and comprises a body portion 20 having an elongated slot 21 formed therein with opposite end portions 22 and 24 of the slot being offset laterally at the medial portion. The side edges of the opposite end portions of the slot are joined at the medial portion by edge portions 26 and 28, each of which are inclined upwardly and curve inwardly beyond each other to corners 30 and 32, forming a stud-receiving opening 34 therebetween and then are inclined downwardly from the corners in a direction generally radially of the stud opening 34.

The dimensions of the various portions of the fastener are so arranged that the distance between the corners 30 and 32 is slightly less than the diameter of the stud 12 to be assembled therein, and the distance between the edges of the slot in a direction perpendicular to a line drawn between the corners 30 and 32 is greater than the distance between the corners.

In the manufacture of the device, the slot 21 is punched out of the body while it is flat, and the portion of the body adjacent each medial portion is then formed upwardly to impart the previously described shape thereto. As shown in Fig. 4 which is an enlarged view of the medial portion of one of the side edges, the upward forming operation tilts the vertical edge of the corner so that the lower end thereof is disposed further inwardly than the outer edge.

To provide means for engagement with a suitable tool 35, a pair of upwardly projecting ears 36, having inwardly facing shoulders 38, are provided on the opposite edge portions of the fastener to snap into engagement with suitable shouldered portions 37 on the tool.

The stud 12 onto which the fastener is to be assembled may be provided with a conical end 40 to facilitate starting the fastener into engagement therewith. As the fastener is pushed onto the stud, the edges 26 and 28 gradually flex slightly upwardly to enlarge the stud opening 34, causing the edges 26 and 28 to bear tightly against the stud. As the stud is rotated, the edges tend to dig into the stud more tightly, with the greatest force being concentrated at the lower end of the corner. An extremely high unit pressure is applied to the stud at this point, which has been found to be sufficiently great to permit the entire corner and the inclined portion of the edge, immediately in front of the corner, to dig into the stud.

As seen in Fig. 6, the shape of the stud-engaging aperture is such that the portion of the upwardly inclined edges immediately in front of the corners progress gradually, radially, inwardly, and upwardly, permitting gradual engagement with the stud. Hence rotation of the fastener thereafter tends to wind the edges down the stud, cutting a double thread in the surface thereof until the fastener engages the panel. Thereafter, rotation of the fastener tends to draw the article 14 tightly against the panel, and the edges 26 and 28 tend to flex downwardly and grip the stud more tightly.

In the illustrated embodiment the fastener is designed to be rotated onto the stud, however, in some cases it has been found possible to push it down on the stud against the panel and then rotate it to tighten it.

Although in the illustrated embodiment the fastener is intended for assembly onto studs which have been chromium plated, it is, of course, adapted for use on studs of softer material.

Since certain obvious changes may be made in the device without departing from the scope of the invention, it is intended that all matter contained herein be interpreted in an illustrative and not in a limiting sense.

I claim:

1. A self-threading sheet metal nut adapted to be rotated onto a threadless, smooth stud about a center of rotation coinciding with the axis of said stud and to press threads into said stud, said nut comprising a walled aperture coaxial with said center of rotation, said aperture defined by edges comprising at least two opposed lead-in portions which trace a circular path from opposed sides about the axis of rotation of a diameter at least equal to the diameter of the stud, at least two opposed thread trailing portions which on rotation of the nut trace circular paths from opposed sides about the axis of rotation of less diameter than said stud, and at least two opposed thread pressing ramp portions extending from each lead-in portion to its corresponding trailing portion, said apertured wall throughout said ramp portions and said thread trailing portions being extended helically in a longitudinal direction with respect to said axis.

2. A sheet metal nut in accordance with claim 1 wherein the thread pressing ramp portions progress inwardly toward the axis of rotation of said stud in a generally helical manner as viewed in the direction of said axis of rotation.

3. A self-threading sheet metal nut adapted to be rotated onto a threadless, smooth stud about a center of rotation coinciding with the axis of said stud and to press threads into said stud, said nut comprising a walled aperture coaxial with said center of rotation, said aperture defined by edges comprising at least two opposed lead-in portions which trace a circular path from opposed sides about the axis of rotation of a diameter at least equal to the diameter of the stud, at least two opposed thread trailing portions which on rotation of the nut trace circular paths from opposed sides about the axis of rotation of less diameter than said stud, two opposed thread pressing ramp portions extending from each lead-in portion to its corresponding trailing portion, said lead-in, ramp and thread trailing portions being located in opposed relation to each other centrally of said opening, said nut having at least two conical deformations centered about axes lying in spaced relation on opposed sides of said axis of rotation, said thread trailing portions lying at the highest portions and said lead-in portion lying at lower portions of said conical deformations, respectively.

4. A self-threading sheet metal nut adapted to be rotated onto a threadless, smooth stud having a relatively hard surface so as to press threads into said stud, said nut having an elongated aperture with a medial portion adapted to receive the stud, the opposite side edges of the medial portion being formed into a pair of thread forming portions which are generally portions of a helix to receive the stud therebetween, said thread forming portions each being inclined inwardly from a leading edge portion and curving toward the opposite edge through approximately 90° to terminate at a sharp corner, said corners being disposed longitudinally on opposite sides of the slot so as to be spaced apart a distance less than the diameter of the stud into which it is to be assembled, said leading edges lying in substantially the same plane as the body of the nut and being spaced apart a distance greater than the distance between said corners, whereby when said nut is rotated onto the stud, the thread forming portions press into said stud progressively deeper from said leading edge to said corners.

References Cited in the file of this patent

UNITED STATES PATENTS

| | | |
|---|---|---|
| 1,966,520 | Ryner | July 17, 1934 |
| 2,382,936 | Bedford | Aug. 14, 1945 |
| 2,393,054 | Morehouse | Jan. 15, 1946 |
| 2,408,573 | Morehouse | Oct. 1, 1946 |
| 2,561,036 | Sodders | July 17, 1951 |

FOREIGN PATENTS

| | | |
|---|---|---|
| 635,044 | France | Dec. 17, 1927 |
| 860,791 | France | Oct. 7, 1940 |